(12) United States Patent
Otani

(10) Patent No.: US 8,370,300 B2
(45) Date of Patent: Feb. 5, 2013

(54) METHOD AND APPARATUS OF DATA PROTECTION

(75) Inventor: Toshio Otani, Bellevue, WA (US)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 13/101,467

(22) Filed: May 5, 2011

(65) Prior Publication Data

US 2012/0284233 A1    Nov. 8, 2012

(51) Int. Cl.
    *G06F 17/00* (2006.01)
(52) U.S. Cl. .................................. 707/639; 707/741
(58) Field of Classification Search .......... 707/733–747, 707/624–626, 633–642
    See application file for complete search history.

(56) References Cited

U.S. PATENT DOCUMENTS

| | | | |
|---|---|---|---|
| 7,237,027 B1* | 6/2007 | Raccah et al. | 709/226 |
| 2005/0065986 A1* | 3/2005 | Bixby et al. | 707/204 |
| 2005/0240635 A1* | 10/2005 | Kapoor et al. | 707/200 |
| 2008/0005468 A1* | 1/2008 | Faibish et al. | 711/114 |
| 2008/0091655 A1* | 4/2008 | Gokhale et al. | 707/3 |
| 2011/0093471 A1* | 4/2011 | Brockway et al. | 707/747 |
| 2011/0161327 A1* | 6/2011 | Pawar | 707/741 |
| 2011/0213765 A1* | 9/2011 | Cui et al. | 707/711 |

OTHER PUBLICATIONS

"Network Appliance Snapshot Technology", NetApp, 2004, 1 page, http://media.netapp.com/documents/snapshot.pdf, Network Appliance, Inc.
"Continuous data protection", Apr. 14, 2011, 3 pp., http://en.wikipedia.org/wiki/Continuous_data_protection, Wikipedia.

* cited by examiner

*Primary Examiner* — Wilson Lee
(74) *Attorney, Agent, or Firm* — Mattingly & Malur, P.C.

(57) ABSTRACT

A contents management system comprises a plurality of subsystems which include: a storage subsystem to store a plurality of objects; a contents gateway server configured to create snapshots of the objects and store the snapshots in a first snapshot layer; a system management control unit configured to determine whether the number of snapshots in the first snapshot layer exceeds a corresponding limit for the first snapshot layer and, if yes, to migrate the snapshots from the first snapshot layer to a second snapshot layer provided by another subsystem of the contents management system, and delete the migrated snapshots from the first snapshot layer; and a contents management server configured to track location changes of the snapshots of the objects during migration of the snapshots and to re-index an index data of the snapshots of the objects based on the tracked location changes.

19 Claims, 22 Drawing Sheets

Flowchart (Checking Snapshot Overflowing)

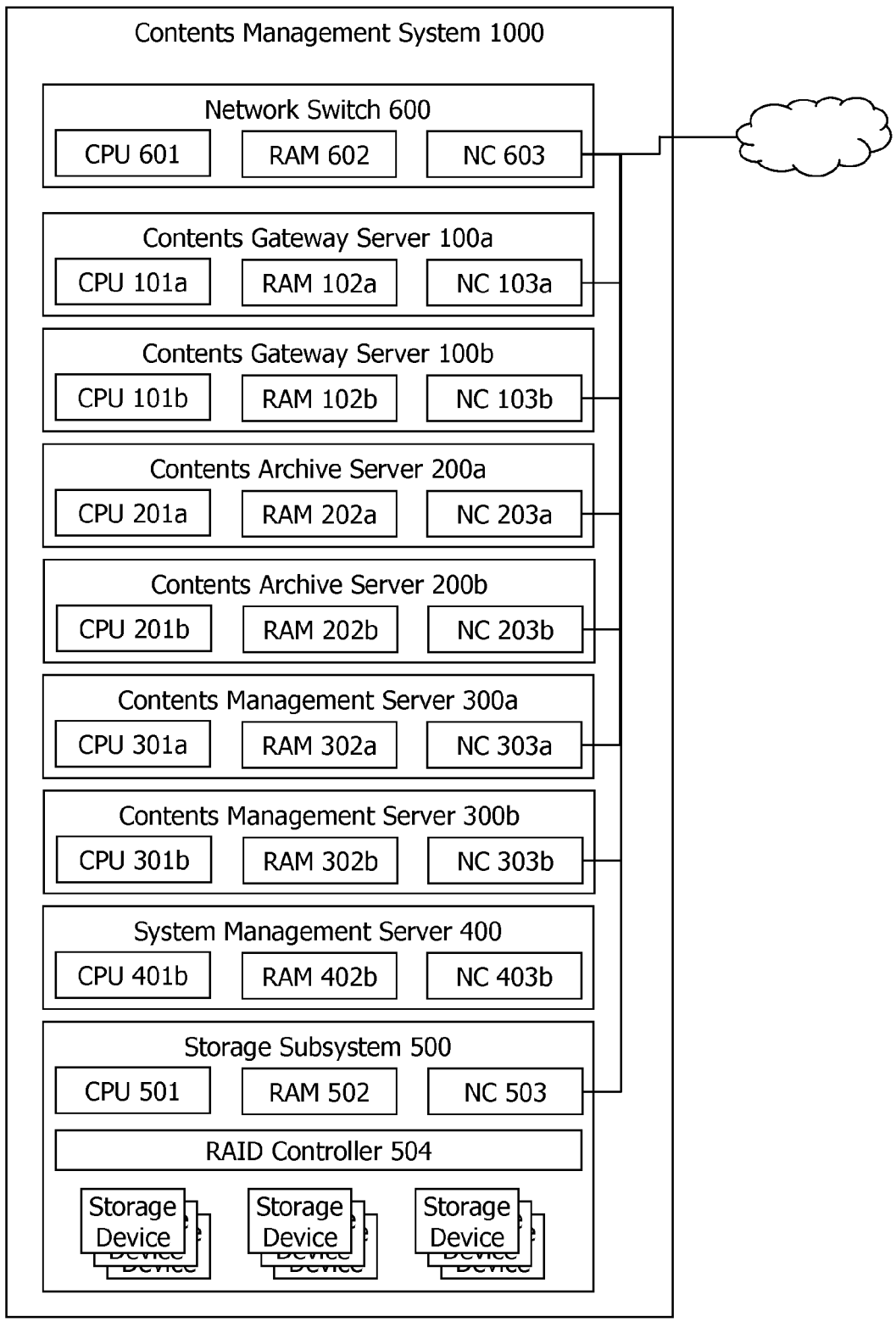
Fig.1 System Configuration

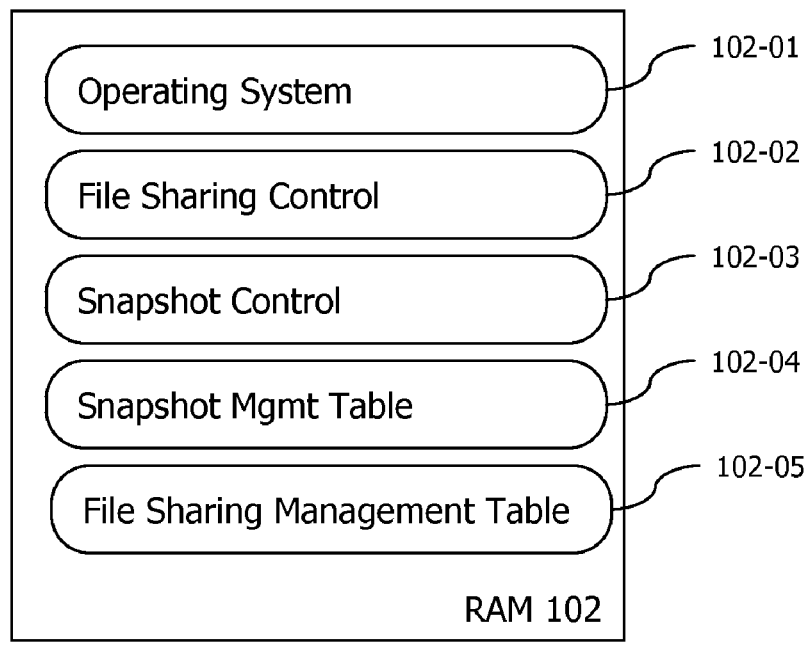
Fig.2 Contents Gateway Server (CGS) Software Configuration

| Port # | LUN | Device name | File Sharing Name |
|---|---|---|---|
| P001 | 0 | /dev/sda0 | \\CGS100a\share01 |
| P001 | 11 | /dev/sda11 | \\CGS100a\SS01 |
| P001 | 12 | /dev/sda12 | \\CGS100a\SS02 |
| P001 | 13 | /dev/sda13 | \\CGS100a\SS03 |

102-05

Fig. 2A File Sharing Mgmt Table on CGS

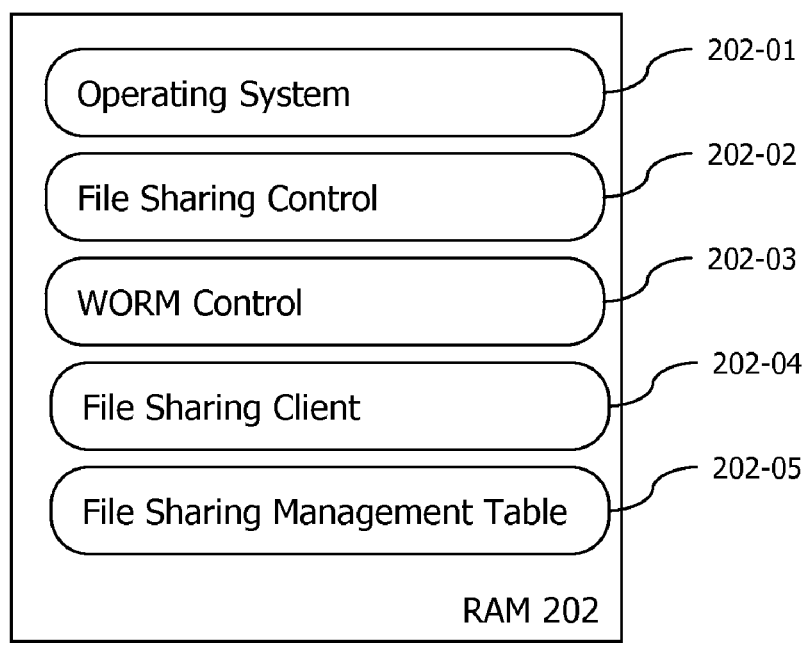
Fig.3 Contents Archive Server (CAS) Software Configuration

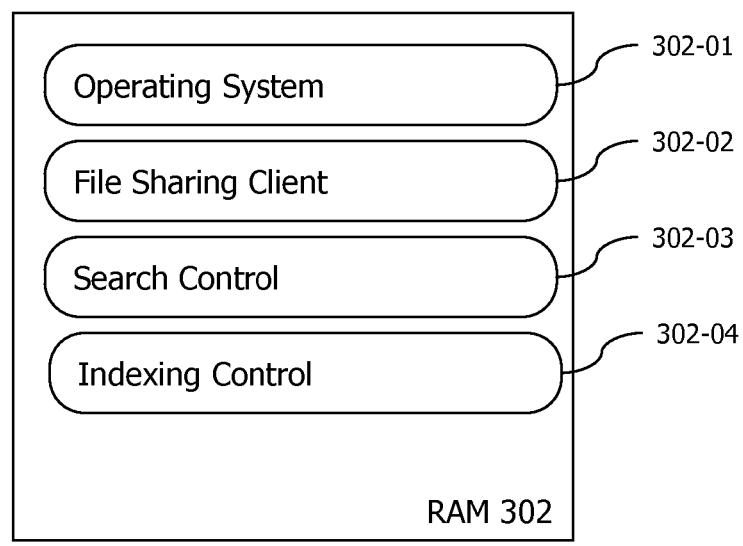
Fig.4 Contents Management Server (CMS) Software Configuration

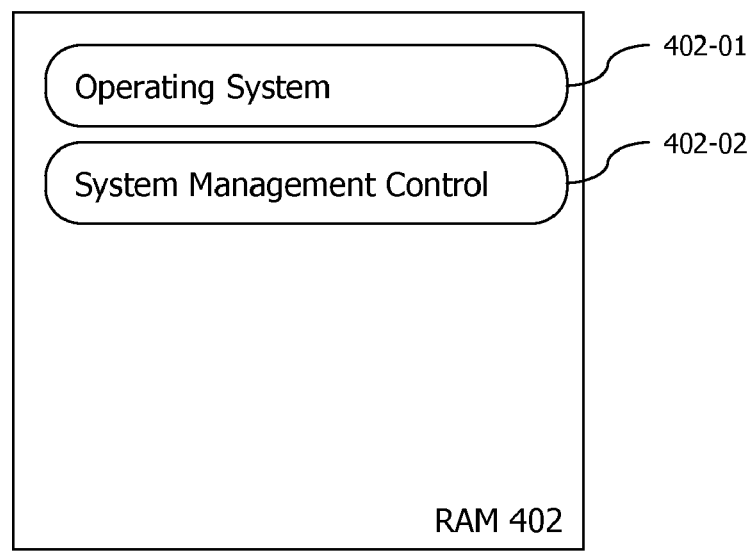
Fig.5 System Management Server (SMS) Software Configuration

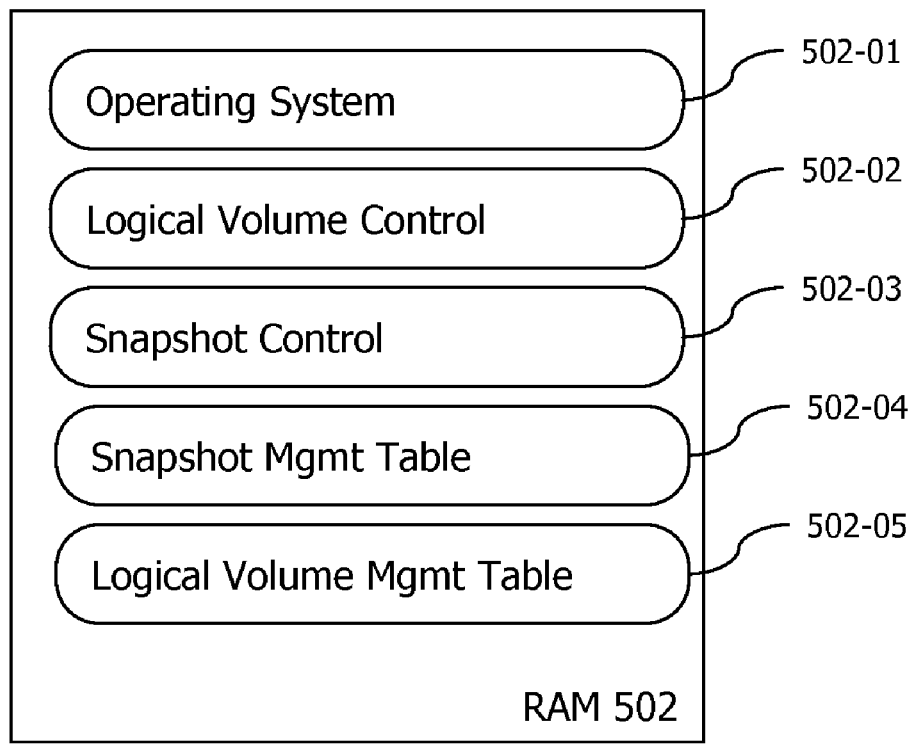
Fig.6 Storage Subsystem Software Configuration

| Generation | VVOL ID | Created |
|---|---|---|
| 1 | 001 | 201102152200 |
| 2 | 002 | 201102161800 |
| 3 | 003 | 201102172030 |

— 502-04

Fig. 6A Snapshot Mgmt Table on Storage Subsystem

| VVOL ID | Port # | LUN |
|---------|--------|-----|
| 001 | P001 | 11 |
| 002 | P001 | 12 |
| 003 | P001 | 13 |

502-05

Fig. 6B Logical Volume Mgmt Table on Storage Subsystem

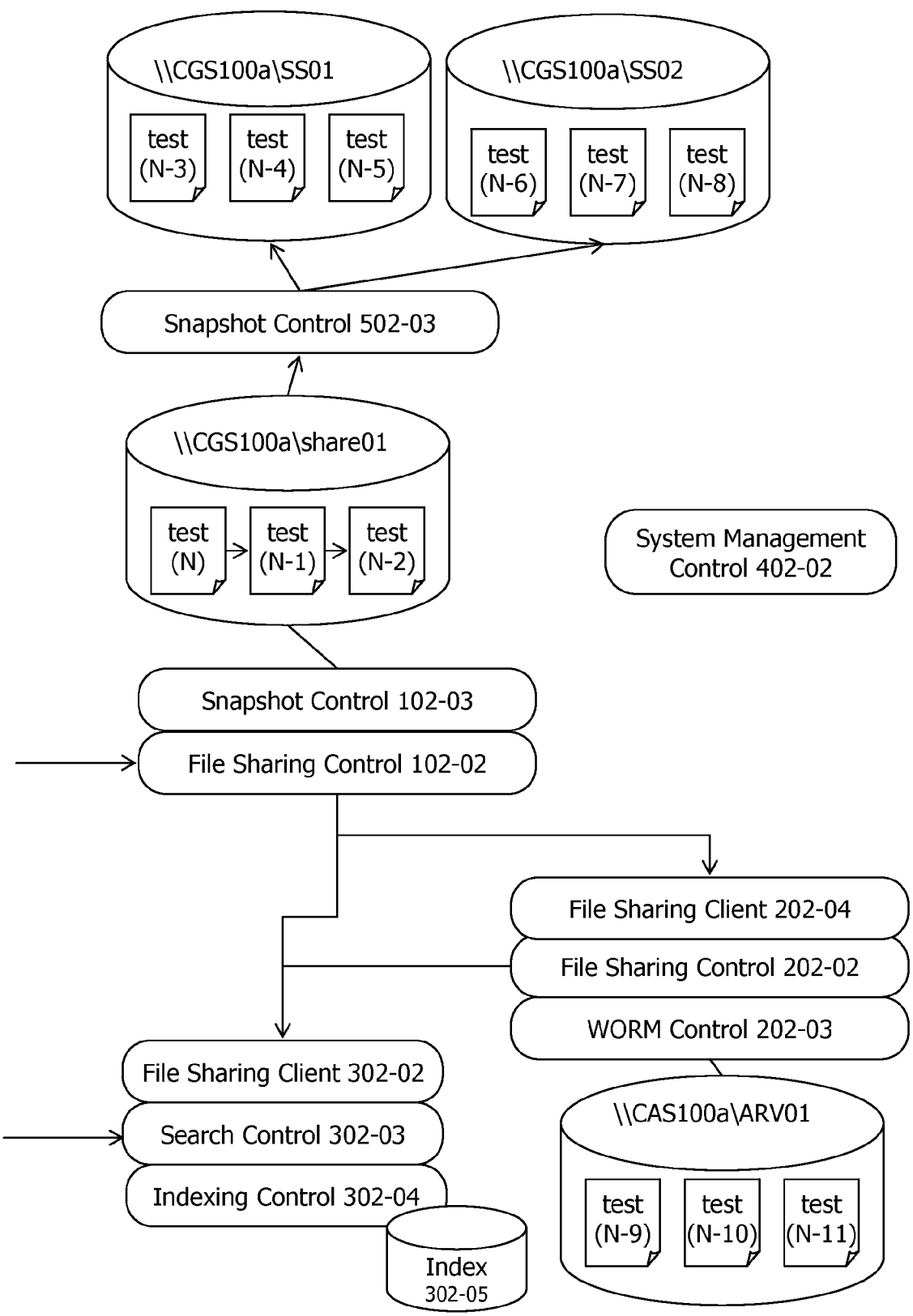
Fig.7 Example of Logical System Configuration

```
\\CGS100a\share01\machine01\machine01_disk_1.vhd
                        \Virtual Machines\F08FF580-5941-4DB2-99D1-736FDDD61D8D.xml
               \machine02\machine02_disk_1.vhd
                        \Virtual Machines\2284E776-8D4C-4D8E-9B3C-E113BCCDF785.xml
     \snapshot\20110221151000\machine02\machine02_disk_1.vhd
                        \Virtual Machines\2284E776-8D4C-4D8E-9B3C-E113BCCDF785.xml
              \20110221151010\machine01\machine01_disk_1.vhd
                        \Virtual Machines\F08FF580-5941-4DB2-99D1-736FDDD61D8D.xml
                        \machine02\machine02_disk_1.vhd
                        \Virtual Machines\2284E776-8D4C-4D8E-9B3C-E113BCCDF785.xml
```

Fig.8 Snapshot on CGS

| Object | Date, time | Location | Attributes |
|---|---|---|---|
| machine01 | Latest | \\CGS100a\share01\ | Disk: machine01_disk_1.vhd |
| machine02 | Latest | \\CGS100a\share01\ | Disk: machine02_disk_1.vhd |
| machine02 | 201102151000 | \\CGS100a\share01\snapshot\201102151000\ | Disk: machine02_disk_1.vhd |
| machine01 | 201102151010 | \\CGS100a\share01\snapshot\201102151010\ | Disk: machine01_disk_1.vhd |
| machine02 | 201102151010 | \\CGS100a\share01\snapshot\201102151010\ | Disk: machine02_disk_1.vhd |

Fig.9 Index data on CMS

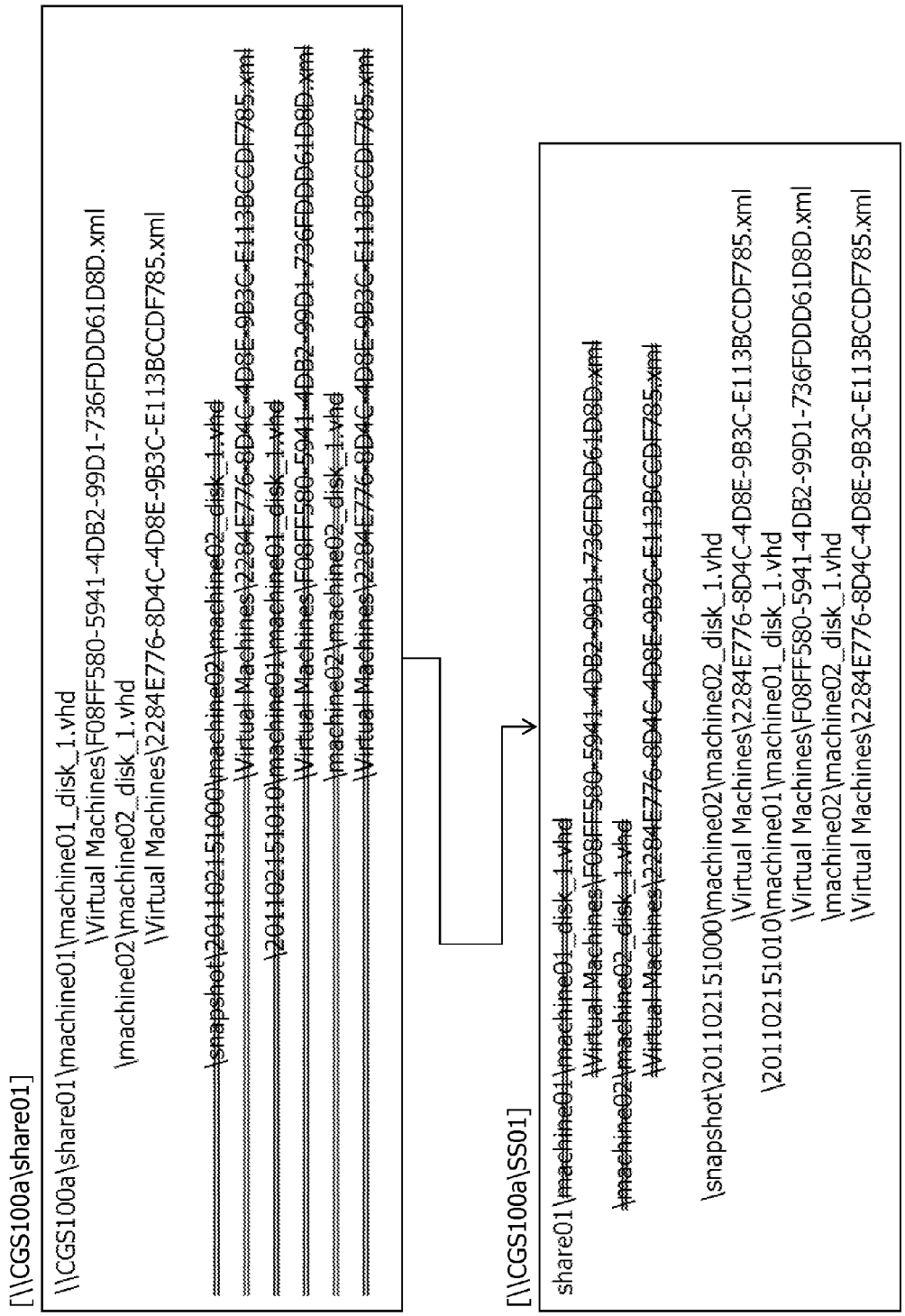
Fig.10a Snapshot on CGS

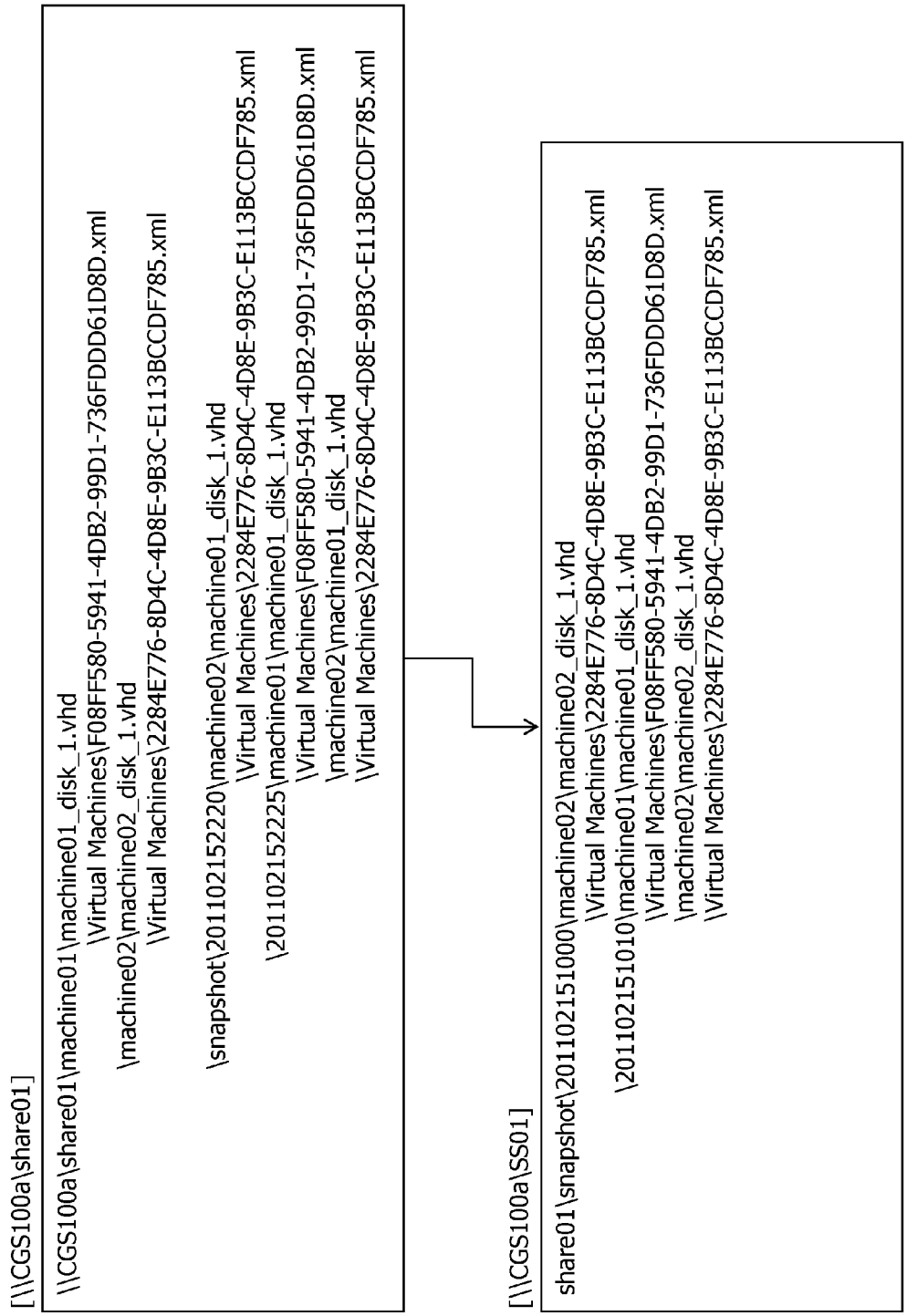
Fig.10b Snapshot on CGS

| Object | Date, time | Location | Attributes |
|---|---|---|---|
| machine01 | Latest | \\CGS100a\share01\ | Disk: machine01_disk_1.vhd |
| machine02 | Latest | \\CGS100a\share01\ | Disk: machine02_disk_1.vhd |
| machine02 | 201102152220 | \\CGS100a\share01\snapshot\201102152220\ | Disk: machine02_disk_1.vhd |
| machine01 | 201102152225 | \\CGS100a\share01\snapshot\201102152225\ | Disk: machine01_disk_1.vhd |
| machine02 | 201102152225 | \\CGS100a\share01\snapshot\201102152225\ | Disk: machine02_disk_1.vhd |
| machine02 | 201102151000 | \\CGS100a\SS01\snapshot\201102151000\ | Disk: machine02_disk_1.vhd |
| machine01 | 201102151010 | \\CGS100a\SS01\snapshot\201102151010\ | Disk: machine01_disk_1.vhd |
| machine02 | 201102151010 | \\CGS100a\SS01\snapshot\201102151010\ | Disk: machine02_disk_1.vhd |

Fig.11 Index data on CMS

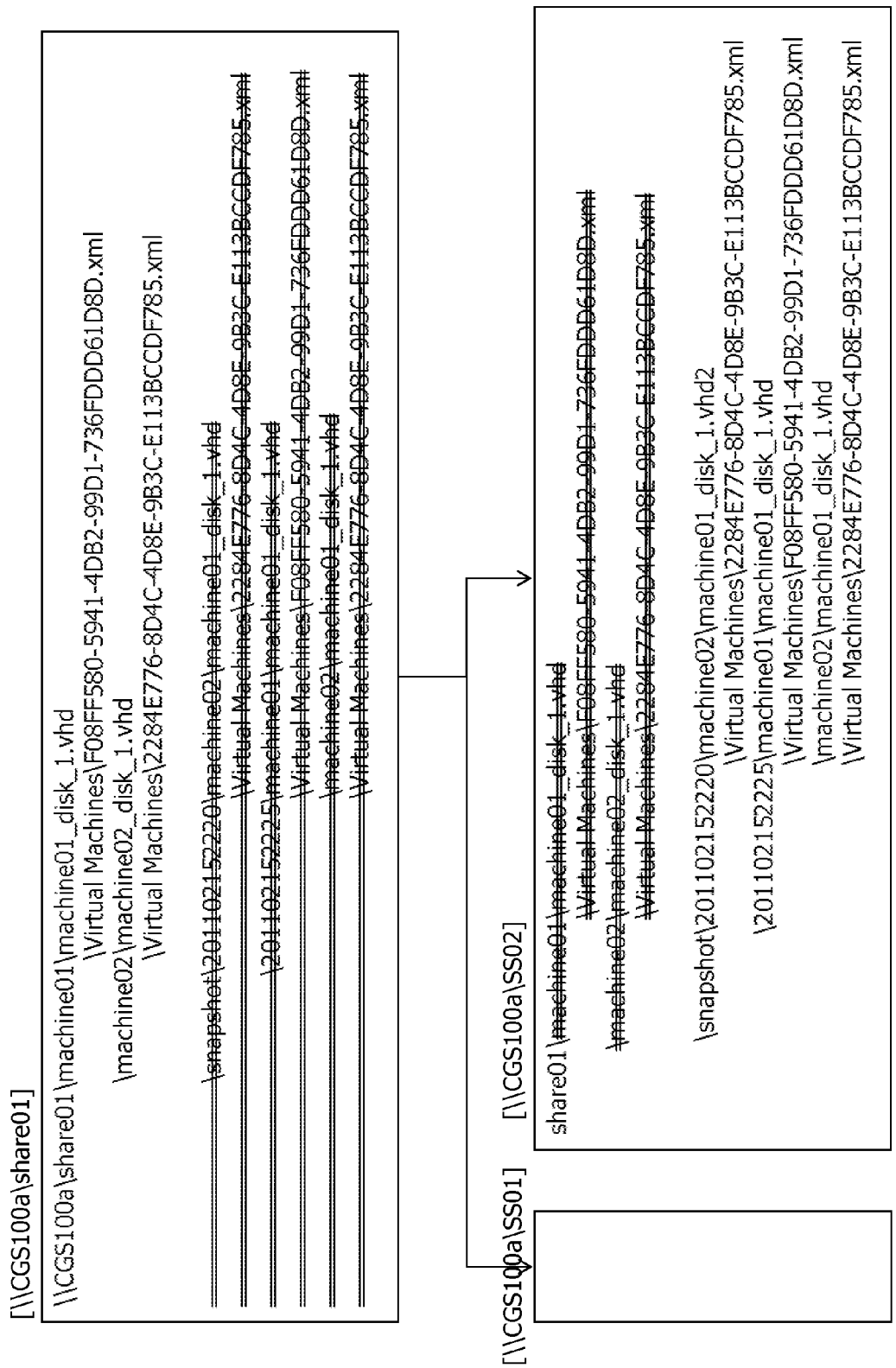
Fig.12 Snapshot on CGS

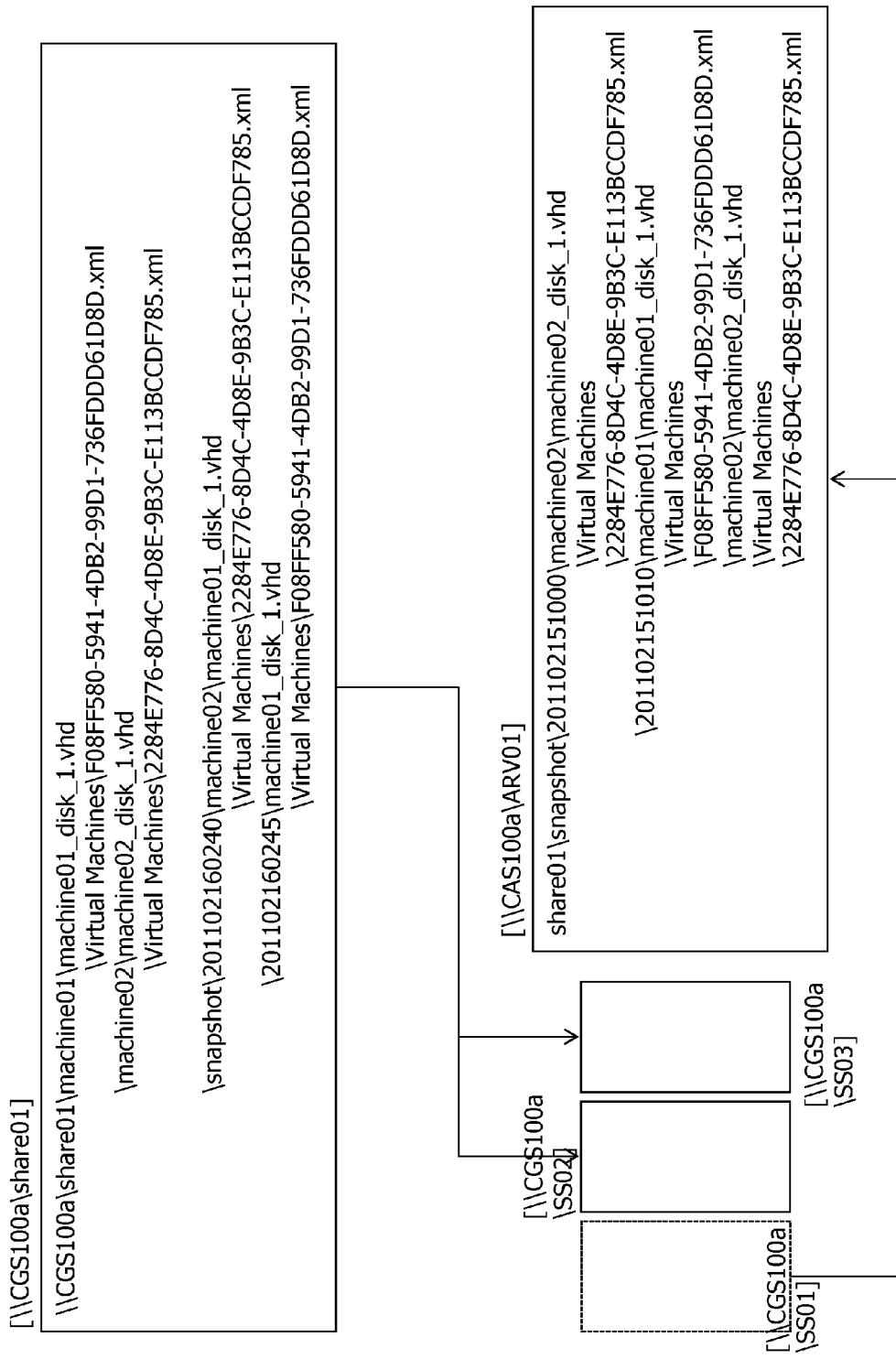
Fig.13 Snapshot on CGS and Archive on CAS

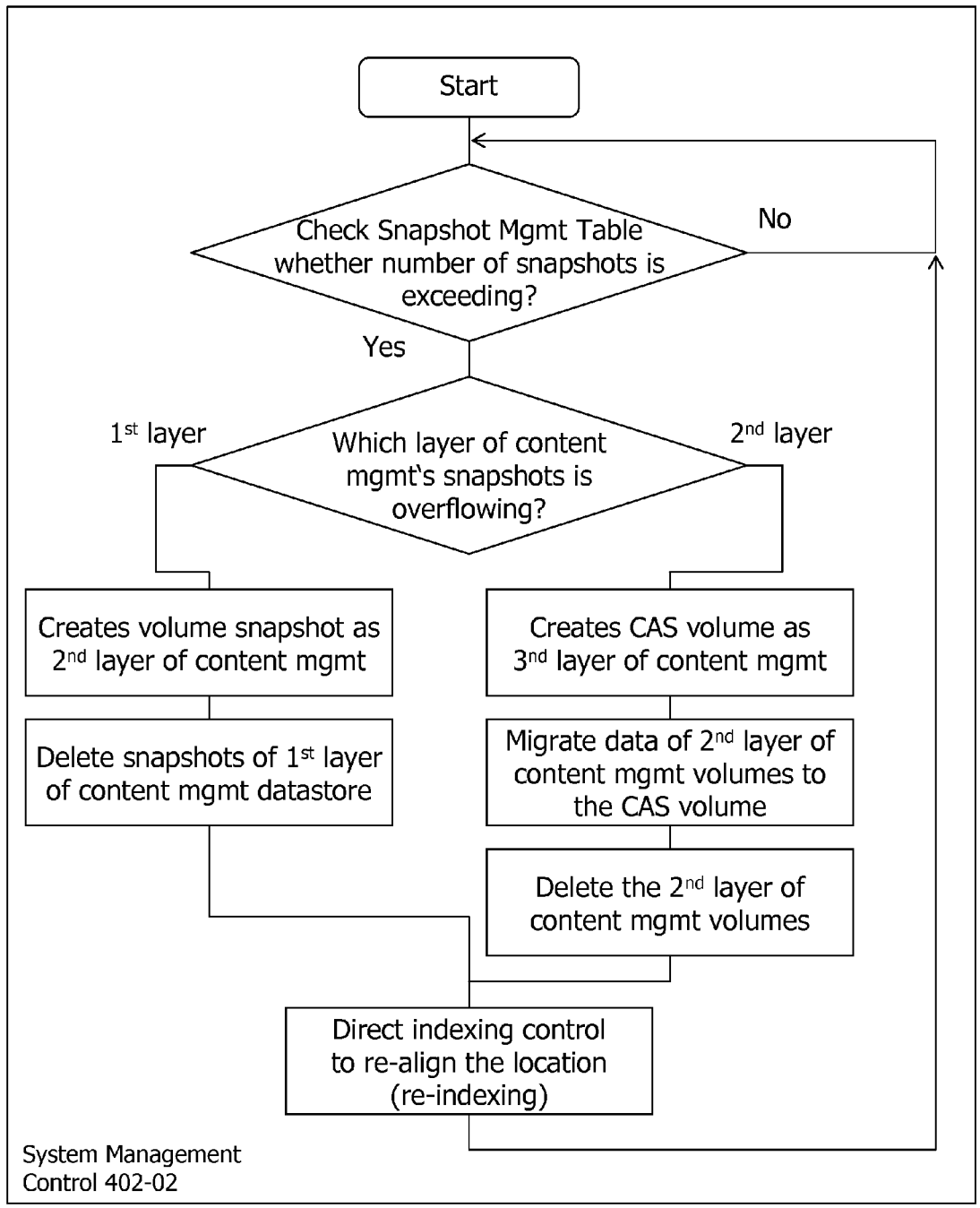
Fig.14 Flowchart (Checking Snapshot Overflowing)

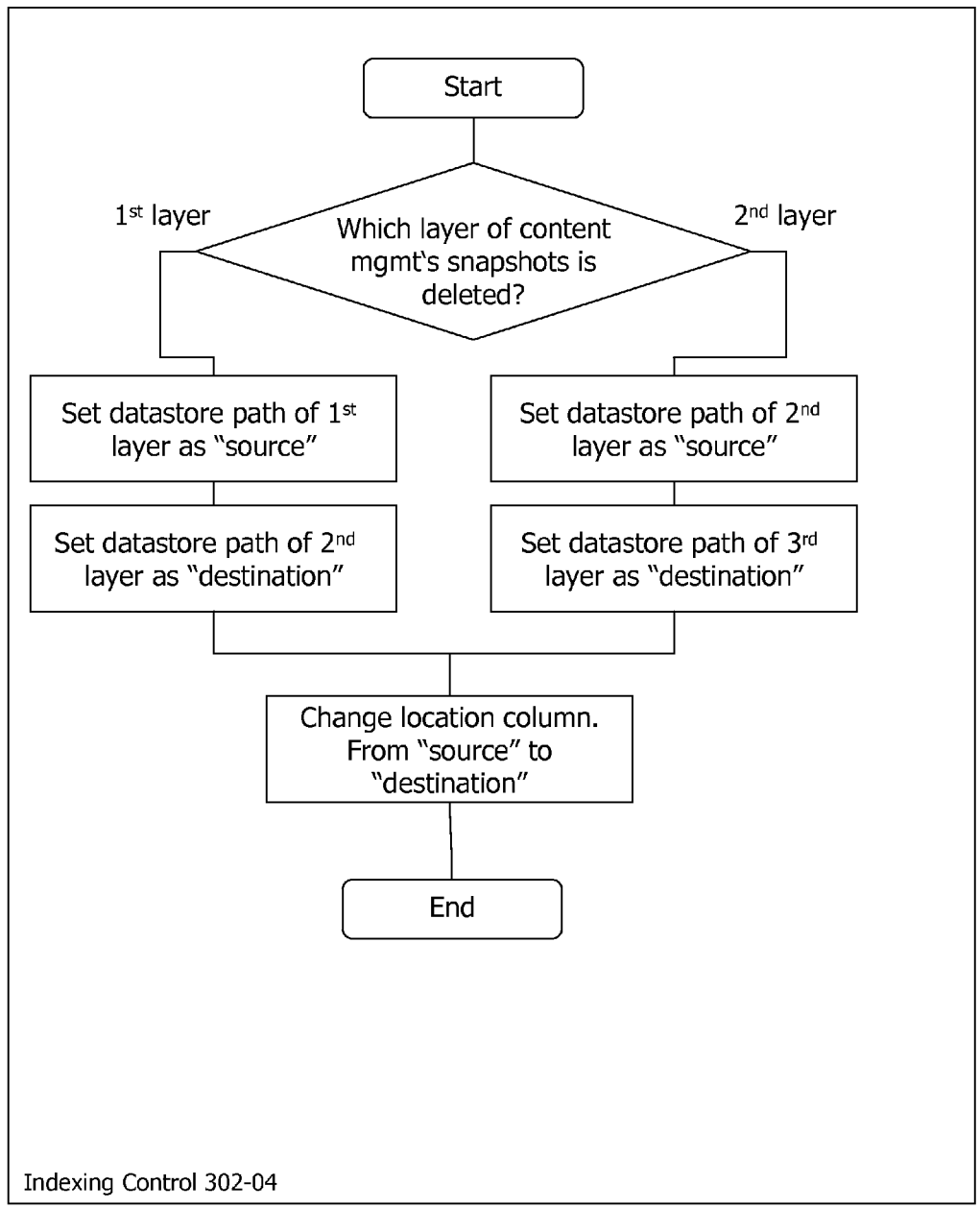
Fig.15 Flowchart (Re-indexing)

Fig.16 GUI of CMS (searching)

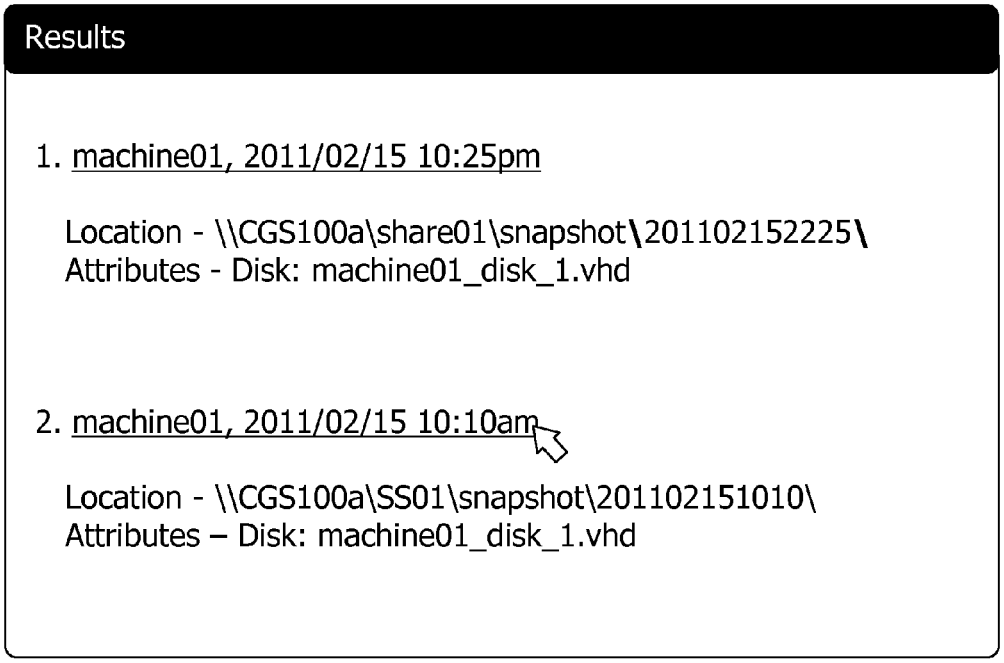
Fig.17 GUI of CMS (showing the result)

| |
|---|
| \\CGS100a\share01\machine01\Virtual Machines\F08FF580-5941-4DB2-99D1-736FDDD61D8D.xml |
| <?xml version="1.0" encoding="UTF-16" standalone="yes" ?><br><configuration><br><ethernet_card0><br>  <friendly_name type="string">Ethernet Port</friendly_name><br>  <is_attached type="bool">True</is_attached><br>  <mac_address type="bytes">AAAAAAAA</mac_address><br>  <mac_address_is_static type="bool">False</mac_address_is_static><br>  <msvm_switchport type="string" /><br>  <virtual_port_name type="string" /><br>  <virtual_switch_name type="string" /><br>  </ethernet_card0><br>...<br> <controller0><br> <drive0><br> <pathname type="string">\\CGS100a\share01\machine01\machine01_disk_1.vhd<br>  </pathname><br>  <type type="string">VHD</type><br>  </drive0><br><drive1><br>  <pathname type="string" /><br>  <type type="string">NONE</type><br>  </drive1><br>  </controller0><br>... |

Fig.18 Example of virtual machine management file

METHOD AND APPARATUS OF DATA PROTECTION

BACKGROUND OF THE INVENTION

The present invention relates generally to methods and systems that provide contents data management, especially those involving backup of data and archiving of data.

Current solutions to protect data against loss, corruption, or the like include snapshot and CDP (Continuous Data Protection). Snapshot has a limitation of the number of snapshots that it takes. CDP cannot provide immediate data restore when users want to restore older data.

BRIEF SUMMARY OF THE INVENTION

Exemplary embodiments of the invention provide a technique for contents data management involving backup of data and archiving of data based on nesting snapshots. The system provides a first snapshot layer of snapshots to store snapshots of objects of data stored in a storage subsystem. If the number of the snapshots in the first snapshot layer exceeds its limit, the system creates a second snapshot layer to store the snapshots migrated from the first snapshot layer and deletes the snapshots from the first layer in order to allow next snapshots creation for the first snapshot layer. If the number of the second snapshot layer exceeds its limit, the system creates a third snapshot layer to provide archive volumes, migrates the snapshots data from the second snapshot layer to the archive volumes of the third snapshot layer, and then removes the snapshots from the second snapshot layer. There is no limitation in the number of snapshots in this system, and the technique for contents data management provides quick data recovery. This technique is used to provide a contents management system, especially for many records of objects such as files.

In accordance with an aspect of the present invention, a contents management system comprises a plurality of subsystems which include: a storage subsystem to store a plurality of objects; a contents gateway server configured to create snapshots of the objects and store the snapshots in a first snapshot layer; a system management control unit configured to determine whether the number of snapshots in the first snapshot layer exceeds a corresponding limit for the first snapshot layer and, if yes, to migrate the snapshots from the first snapshot layer to a second snapshot layer provided by another subsystem of the contents management system, and delete the migrated snapshots from the first snapshot layer; and a contents management server configured to track location changes of the snapshots of the objects during migration of the snapshots and to re-index an index data of the snapshots of the objects based on the tracked location changes.

In some embodiments, the plurality of subsystems include a contents archive server which creates the second snapshot layer to provide archive volumes for the snapshots migrated from the first snapshot layer. The second snapshot layer is created by the storage subsystem to provide snapshot volumes for the snapshots migrated from the first snapshot layer. The system management control unit is configured to determine whether the number of snapshots in the second snapshot layer exceeds a corresponding limit for the second snapshot layer and, if yes, to migrate the snapshots from the second snapshot layer to a third snapshot layer provided by another subsystem of the contents management system, and delete the migrated snapshots from the second snapshot layer. The second snapshot layer is created by the storage subsystem to provide snapshot volumes for the snapshots migrated from the first snapshot layer, and the contents management system further comprises a contents archive server which creates the third snapshot layer to provide archive volumes for the snapshots migrated from the second snapshot layer.

In specific embodiments, the contents management server includes an indexing control module configured to re-index the index data which comprises identifying, from among the snapshot layers, a source snapshot layer from which the snapshots are deleted and a destination snapshot layer from which the deleted snapshots are migrated, and updating locations of the snapshots of the objects from locations of the source snapshot layer to locations of the destination snapshot layer. The indexing control module is configured to record in the index data a date and a time at which each of the snapshots of the objects is stored at the location which is updated. The system management control unit is configured, if the number of snapshots in the first snapshot layer exceeds a corresponding limit for the first snapshot layer, to migrate some of the snapshots from the first snapshot layer to the second snapshot layer and migrate remainder of the snapshots from the first layer to a third snapshot layer provided by yet another subsystem of the contents management system, and delete the migrated snapshots from the first snapshot layer.

Another aspect of the invention is directed to a contents management method for a contents management system having a plurality of subsystems which include a storage subsystem storing a plurality of objects. The method comprises: creating snapshots of the objects and storing the snapshots in a first snapshot layer; determining whether the number of snapshots in the first snapshot layer exceeds a corresponding limit for the first snapshot layer and, if yes, migrating the snapshots from the first snapshot layer to a second snapshot layer provided by another subsystem of the contents management system, and deleting the migrated snapshots from the first snapshot layer; and tracking location changes of the snapshots of the objects during migration of the snapshots and re-indexing an index data of the snapshots of the objects based on the tracked location changes.

In some embodiments, the second snapshot layer is created by a contents archive server to provide archive volumes for the snapshots migrated from the first snapshot layer. The second snapshot layer is created by the storage subsystem to provide snapshot volumes for the snapshots migrated from the first snapshot layer. The method further comprises determining whether the number of snapshots in the second snapshot layer exceeds a corresponding limit for the second snapshot layer and, if yes, migrating the snapshots from the second snapshot layer to a third snapshot layer provided by another subsystem of the contents management system, and deleting the migrated snapshots from the second snapshot layer. The second snapshot layer is created by the storage subsystem to provide snapshot volumes for the snapshots migrated from the first snapshot layer, and the third snapshot layer is created by a contents archive server to provide archive volumes for the snapshots migrated from the second snapshot layer.

In specific embodiments, re-indexing the index data comprises identifying, from among the snapshot layers, a source snapshot layer from which the snapshots are deleted and a destination snapshot layer from which the deleted snapshots are migrated, and updating locations of the snapshots of the objects from locations of the source snapshot layer to locations of the destination snapshot layer. The method further comprises recording in the index data a date and a time at which each of the snapshots of the objects is stored at the location which is updated. The method further comprises, if the number of snapshots in the first snapshot layer exceeds a corresponding limit for the first snapshot layer, migrating some of the snapshots from the first snapshot layer to the second snapshot layer and migrating remainder of the snapshots from the first snapshot layer to a third snapshot layer provided by yet another subsystem of the contents management system, and deleting the migrated snapshots from the first snapshot layer.

Another aspect of this invention is directed to an interface for searching a location of a snapshot of an object among a plurality of objects stored in a storage subsystem in a contents management system which has a plurality of subsystems; wherein snapshots of the objects are created and stored in a first snapshot layer provided by one of the subsystems; wherein if the number of snapshots in the first snapshot layer exceeds a corresponding limit for the first snapshot layer, the snapshots from the first snapshot layer are migrated to a second snapshot layer provided by another subsystem of the contents management system, and the migrated snapshots are deleted from the first snapshot layer; and wherein location changes of the snapshots of the objects during migration of the snapshots are tracked and an index data of the snapshots of the objects is re-indexed based on the tracked location changes, the index data including identifiers of the objects and locations of the snapshots of the objects. The interface comprises computer readable program code devices for displaying an area to receive an identifier of the object for which the snapshot of the object is to be located, and displaying a location of the snapshot of the object associated with the identifier based on the index data.

In some embodiments, the interface further comprises computer readable program code devices for displaying an area to receive a range of date and time for searching the location of the snapshot of the object associated with the identifier, wherein the index data includes a date and a time at which each of the snapshots of the objects is stored at the location which is updated, and displaying the date and time as well as the location of the snapshot of the object associated with the identifier based on the index data. The location for the snapshot of the object being displayed comprises a data store path that identifies the snapshot layer which stores the snapshot and the date and time at which the snapshot is stored in the identified snapshot layer.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of a contents management system according to one embodiment of the invention.

FIG. 2 shows an example of the software configuration of a contents gateway server.

FIG. 2A shows an example of a file sharing management table in the contents gateway server.

FIG. 3 shows an example of the software configuration of a contents archive server.

FIG. 4 shows an example of the software configuration of a contents search server.

FIG. 5 shows an example of software configuration of a system management server.

FIG. 6 shows an example of the software configuration of a storage subsystem.

FIG. 6A shows an example of a snapshot management table in the storage subsystem.

FIG. 6B shows an example of a logical volume management table in the storage subsystem.

FIG. 7 shows an example of the logical system configuration of the contents management system of FIG. 1.

FIG. 8 shows an example of snapshotting on the contents gateway server.

FIG. 9 shows an example of index data.

FIG. 10A and FIG. 10B show examples of creating a snapshot on the contents gateway server.

FIG. 11 shows an example of the index data after snapshot migration.

FIG. 12 shows an example of two or more volume snapshots on the contents gateway server.

FIG. 13 shows an example for migrating data of volume snapshots to archive on the contents archive server.

FIG. 14 shows an example of a flow diagram illustrating a process for checking snapshot overflowing by the system management control.

FIG. 15 shows an example of a flow diagram illustrating a process for re-indexing by the indexing control of the contents management server.

FIG. 16 shows an example of a GUI of the contents management server for searching.

FIG. 17 shows an example of a GUI of the contents management server for displaying the result of the searching.

FIG. 18 shows an example of a virtual machine management file.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for contents data management to achieve data protection.

System Configuration

FIG. 1 illustrates an example of a contents management system according to one embodiment of the invention. The contents management system 1000 includes one or more contents gateway servers 100 (CGS), one or more contents archive servers 200 (CAS), one or more contents management servers 300 (CMS), one or more system management servers 400 (SMS), one of more storage subsystems 500, and one of more network switches 600. The servers (CGS 100, CAS 200, CMS 300, SMS 400) and storage subsystem 500 each have CPU, RAM (memory), and Network Controller (e.g., Ethernet) to connect to the network switch 600. Additionally, the storage subsystem 500 has RAID controller and storage devices such as SSD and HDD to provide storage logical volume (LU: logical unit) to the other servers (CGS 100, CAS 200, CMS 300, SMS 400) via the network switch 600 using SAN (Storage Area Network), for instance.

FIG. 2 shows an example of the software configuration of the contents gateway server (CGS) 100, as stored on memory such as RAM 102. An operating system 102-01 manages the file system on the volumes which is provided by the storage subsystem 500. A file sharing control 102-02 provides file sharing service of the volumes to the clients, such as NFS, CIFS, HTTP, and the like. A snapshot control 102-03 enables to create snapshots of each file on the volumes. A snapshot management table 102-04 contains the management information of each file's snapshot tracking records.

FIG. 2A shows an example of a file sharing management table 102-05 in the CGS 100. It has columns of Port#, LUN, Device Name, and File Sharing Name. When a snapshot volume is created, the CGS 100 detects the new LUN to attach in order to create the disk device for file sharing (e.g., \\CGS100a\SS01). When the snapshot volume is deleted, the related LUN and disk device should be deleted from the CGS before deletion of the snapshot volume from the storage subsystem.

FIG. 3 shows an example of the software configuration of the contents archive server (CAS) 200, as stored on memory such as RAM 202. An operating system 102-01 manages the file system on the volumes which is provided by the storage subsystem 500. A file sharing control 202-02 provides file sharing service of the volumes to the clients, such as NFS, CIFS, HTTP, and the like. A WORM (Write Once Read Many) control 202-03 provides files not to be rewritten after the file creation. It is a distinguished feature of the contents management system 1000 especially for archival data. The RAM 202 further includes file sharing client 202-04 and file sharing management table 202-05.

FIG. 4 shows an example of the software configuration of the contents management server (CMS) 300, as stored on memory such as ARM 302. It has an operating system 302-01. A file sharing client 302-02 gives the CMS 300 the feature to read/write file data to the file sharing control on the CGS 100 and CAS 200. A search control 302-03 provides the process to search contents of each file. For instance, it searches the file for contents such as those shown in FIG. 18, picks up metadata such as disk drive information (machine01_disk_1.vhd), and then aligns and stores the information into the index data as shown in FIG. 9, for instance.

FIG. 5 shows an example of the software configuration of the system management server (SMS) 400. It has an operating system 402-01. A system management control 402-02 controls the procedure for contents management in this system.

FIG. 6 shows an example of the software configuration of the storage subsystem 500. It has an operating system 502-01. A logical volume control 502-02 provides volume (LU) service to the other hosts such as CGS 100, CAS 200, and CMS 300 by using SAN protocol such as iSCSI. A snapshot control 502-03 creates volume level snapshots of each volume. A snapshot management table 502-04 contains the management information of each volume's snapshot tracking records.

FIG. 6A shows an example of a snapshot management table 502-04 in the storage subsystem 500. It has columns of Generation (e.g., 1, 2, 3, etc.), VVOL ID (Virtual Volume ID), and Created (e.g., year, month, day, and time of creation). If the maximum number of snapshots of the CGS 100 exceeds its limit (see FIGS. 8 and 10), the volume level snapshot on the storage array will be created. The VVOL ID is the identifier of the snapshot volume for a certain PVOL (Primary Volume).

FIG. 6B shows an example of the logical volume management table 502-05 in the storage subsystem 500. It has columns of VVOL ID, Port#, and LUN. In order to expose the VVOL for the CGS 100 to be mounted, the VVOL has to have LUN and be assigned to a physical port on the storage array. Using this logical volume management table 502-05, a host such as the CGS 100 can attach the VVOLs (001, 002, 003 in this example) by accessing the port (P001 in this example) on the storage subsystem 500 as LUN 11, 12, 13 in this example.

Contents Management

FIG. 7 shows an example of the logical system configuration of the contents management system 1000 of FIG. 1. The configuration shows the file sharing control 102-02 and snapshot control 102-03 of the CGS 100 as the first layer of contents management, the snapshot control 502-03 of the storage subsystem 500 as the second layer of contents management, the file sharing control 202-02 of the CAS 200 as the third layer of contents management, and the file sharing client 302-02 and search control 302-03 and indexing control 302-04 for index 302-05 of the CMS 300 as the contents management feature.

At first, an external system such as client PC server writes data to the file sharing control 102-02 (filename: test), which is represented as \\CGS100a\share01. The files in \\CGS100a\share01 are snapshotted by certain timing such as write I/O completion or at regular intervals. In this document, the file "test" is snapshotted at 5 minute intervals if the file is updated at that moment. FIG. 8 shows an example of snapshotting on \\CGS100a\share01. It has the directory named "snapshot" and there are several snapshots for the objects such as machine01_disk_1.vhd.

The CGS file sharing control 102-02 and snapshot control 102-03 have a limitation in the number of snapshots. Once the system management control 402-02 detects that the number of snapshots of the file "test" exceeds the number of snapshots limitation of the system, the system management control 402-02 creates a volume level snapshot of \\CGS100a\share01 by using the storage system snapshot control 502-03. In this case \\CGS100a\SS01 will be created. At the same moment, the system management control 402-02 directs the CGS snapshot control 102-03 to delete all snapshots on \\CGS100a\share01. It enables the snapshot control 102-03 to re-create more snapshots on \\CGS100a\share01. FIG. 10A shows an example of creating \\CGS100a\SS01 as the second layer of contents management. At the same moment, related snapshots on \\CGS100a\share01 will be deleted and the objects which represent the latest on \\CGS100a\SS01 will be also deleted. After that, the CGS snapshot control 102-03 can create more snapshots on \\CGS100a\share01 as shown in FIG. 10B. FIG. 12 shows an example of two or more volume snapshots.

As same as the limitation of snapshot control 102-03, the storage system snapshot control 502-03 has a similar limitation of a maximum number of snapshots to create. If the system management control 402-02 detects that the number of volume snapshots exceeds the number of snapshots limitation of the system, the system management control 402-02 directs the CAS file sharing client 202-04 to read data of one or more snapshot volumes (created by the storage system snapshot control 502-03), write the data to its own volume such as \\CAS100a\ARV01, and then delete the one or more snapshot volumes of the storage system snapshot control 502-03. It enables the snapshot control 502-03 to re-create more snapshots. FIG. 13 shows an example for migrating data of volume snapshots to \\CAS100a\ARV01 as the third layer of contents management.

The CMS indexing control 302-04 tries to create the index data 302-05 which includes metadata of each object on the system such as file "test." FIG. 9 shows an example of the index data 302-05. At first, the CMS indexing control 302-04 gets data on \\CGS100a\share01 at regular intervals. When the system management control 402-02 tries to delete snapshots and move data to the next layer of the contents management store (i.e., \\CGS100a\share01 to \\CGS100a\SS01), the system management control 402-02 directs the indexing control 302-04 to change the location of each object. For instance, a snapshot of object "machine02" at 201102151000 (Feb. 15th, 10 am) is located on \\CGS100a\share01 as shown in the "Object," "Date, time," and "Location" columns of the index data in FIG. 9. The "Object" column stores the identifier of the object. The "Date, time" column stores the date and time at which the snapshot of the object is stored at the location. When the system management control 402-02 detects the number of snapshots is exceeding the maximum, the snapshot of "machine02" at 201102151000 will be migrated to \\CGS100a\SS01\ as shown in FIG. 11, which illustrates the index data after snapshot migration. At this moment, the indexing control 302-04 changes the location pointer on the index data 302-05, and will not try to read the data from \\CGS100a\SS01\ again.

FIG. 14 shows an example of a flow diagram illustrating a process for checking snapshot overflowing by the system management control 402-02. The program checks the snapshot management table to determine whether the maximum allowable number of snapshots is exceeded. If no, the program returns to the top and repeats the checking. If yes, the program determines which layer of snapshots of the contents management system 1000 is overflowing. If the first layer (CGS layer) is overflowing, the program creates volume level snapshots as the second layer of contents management and deletes the snapshots of the first layer of the contents management data store, and then directs the indexing control 302-04 of the CMS 300 to re-align the location (i.e., re-indexing). If the second layer (volume level snapshot layer) is overflowing, the program creates a CAS volume as the third layer of contents management, migrates data of the second layer of contents management volumes to the CAS volume, and deletes the second layer of the contents management volumes, and then directs the indexing control 302-04 of the CMS 300 to re-align the location (i.e., re-indexing).

FIG. 15 shows an example of a flow diagram illustrating a process for re-indexing by the indexing control 302-04 of the contents management server 300. The program determines which layer of snapshots of the contents management system 1000 is deleted. If the first layer (CGS layer) is overflowing, the programs sets the data store path of the first layer as "source," sets the data store path of the second layer as "destination," and changes the "location" column of the index data (see FIGS. 9 and 11) from "source" address to "destination" address. If the second layer (volume level snapshot layer) is overflowing, the programs sets the data store path of the second layer as "source," sets the data store path of the third layer (CAS volume layer) as "destination," and changes the "location" column of the index data (see FIGS. 9 and 11) from "source" address to "destination" address.

The CMS indexing control 302-04 could have a feature to analyze various data formats such as virtual machine data. Popularly, a virtual machine can be managed by a virtual machine management file as shown in FIG. 18, for instance (it is an example of a part of a file). The indexing control 302-04 could analyze this file to get metadata of the virtual machine and virtual disk, and then put the required metadata such as "Disk" to the index data 302-05.

The CMS search control 302-03 enables users and external systems to search the data of the index data 302-05, as shown in FIG. 16 and FIG. 17, for instance. FIG. 16 shows an example of a graphical user interface (GUI) of the CMS 300 for searching. As seen in FIG. 16, the GUI program displays an area to receive an identifier of the object for which the snapshot of the object is to be located, and an area to receive a range of date and time for searching the location of the snapshot of the object associated with the identifier. FIG. 17 shows an example of a GUI of the CMS 300 for displaying the result of the searching. As seen in FIG. 17, the GUI program displays the location and the date and time at which the snapshot of the object associated with the identifier is stored at the location which is updated in the index data. As provided by the index data (see "Location" and "Date, time" columns of FIGS. 9 and 11), the location for the snapshot of the object being displayed comprises a data store path that identifies the snapshot layer which stores the snapshot (see the "File Sharing Name" column in FIG. 2A, e.g., \\CGS100a\share01) and the date and time at which the snapshot is stored in the identified snapshot layer (see the "Created" column in FIG. 6A, e.g., 201102152220).

Other Configurations

Providing the snapshot volumes as the second layer is not mandatory. When overflow of snapshots occurs in the first layer, the system may migrate the data to the third layer, and skip the second layer. Alternatively, the system may migrate the data from the first layer to the second layer (some of the data) and the third layer (remainder of the data).

Of course, the system configurations illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for contents data management to achieve data protection. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A contents management system comprising a plurality of subsystems which include:
    a storage subsystem to store a plurality of objects;
    a contents gateway server configured to create snapshots of the objects and store the snapshots in a first snapshot layer;
    a system management control unit configured to determine whether the number of snapshots in the first snapshot layer exceeds a corresponding limit for the first snapshot layer and, if yes, to migrate the snapshots from the first snapshot layer to a second snapshot layer provided by another subsystem of the contents management system, and delete the migrated snapshots from the first snapshot layer; and
    a contents management server configured to track location changes of the snapshots of the objects during migration of the snapshots and to re-index an index data of the snapshots of the objects based on the tracked location changes.

2. The contents management system according to claim 1, wherein the plurality of subsystems include:
    a contents archive server which creates the second snapshot layer to provide archive volumes for the snapshots migrated from the first snapshot layer.

3. The contents management system according to claim 1, wherein the second snapshot layer is created by the storage subsystem to provide snapshot volumes for the snapshots migrated from the first snapshot layer.

4. The contents management system according to claim 1, wherein the system management control unit is configured to determine whether the number of snapshots in the second snapshot layer exceeds a corresponding limit for the second snapshot layer and, if yes, to migrate the snapshots from the second snapshot layer to a third snapshot layer provided by another subsystem of the contents management system, and delete the migrated snapshots from the second snapshot layer.

5. The contents management system according to claim 4, wherein the second snapshot layer is created by the storage subsystem to provide snapshot volumes for the snapshots migrated from the first snapshot layer; and wherein the contents management system further comprises a contents archive server which creates the third snapshot layer to provide archive volumes for the snapshots migrated from the second snapshot layer.

6. The contents management system according to claim 1, wherein the contents management server includes an indexing control module configured to re-index the index data which comprises identifying, from among the snapshot layers, a source snapshot layer from which the snapshots are deleted and a destination snapshot layer from which the deleted snapshots are migrated, and updating locations of the snapshots of the objects from locations of the source snapshot layer to locations of the destination snapshot layer.

7. The contents management system according to claim 6, wherein the indexing control module is configured to record in the index data a date and a time at which each of the snapshots of the objects is stored at the location which is updated.

8. The contents management system according to claim 1, wherein the system management control unit is configured, if the number of snapshots in the first snapshot layer exceeds a corresponding limit for the first snapshot layer, to migrate some of the snapshots from the first snapshot layer to the second snapshot layer and migrate remainder of the snapshots from the first layer to a third snapshot layer provided by yet another subsystem of the contents management system, and delete the migrated snapshots from the first snapshot layer.

9. A contents management method for a contents management system having a plurality of subsystems which include a storage subsystem storing a plurality of objects, the method comprising:

creating snapshots of the objects and storing the snapshots in a first snapshot layer;

determining whether the number of snapshots in the first snapshot layer exceeds a corresponding limit for the first snapshot layer and, if yes, migrating the snapshots from the first snapshot layer to a second snapshot layer provided by another subsystem of the contents management system, and deleting the migrated snapshots from the first snapshot layer; and tracking location changes of the snapshots of the objects during migration of the snapshots and re-indexing an index data of the snapshots of the objects based on the tracked location changes.

10. The contents management method according to claim 9 wherein the second snapshot layer is created by a contents archive server to provide archive volumes for the snapshots migrated from the first snapshot layer.

11. The contents management method according to claim 9, wherein the second snapshot layer is created by the storage subsystem to provide snapshot volumes for the snapshots migrated from the first snapshot layer.

12. The contents management method according to claim 9, further comprising:

determining whether the number of snapshots in the second snapshot layer exceeds a corresponding limit for the second snapshot layer and, if yes, migrating the snapshots from the second snapshot layer to a third snapshot layer provided by another subsystem of the contents management system, and deleting the migrated snapshots from the second snapshot layer.

13. The contents management method according to claim 12, wherein the second snapshot layer is created by the storage subsystem to provide snapshot volumes for the snapshots migrated from the first snapshot layer; and wherein the third snapshot layer is created by a contents archive server to provide archive volumes for the snapshots migrated from the second snapshot layer.

14. The contents management method according to claim 9, wherein re-indexing the index data comprises:

identifying, from among the snapshot layers, a source snapshot layer from which the snapshots are deleted and a destination snapshot layer from which the deleted snapshots are migrated; and updating locations of the snapshots of the objects from locations of the source snapshot layer to locations of the destination snapshot layer.

15. The contents management method according to claim 14, further comprising:

recording in the index data a date and a time at which each of the snapshots of the objects is stored at the location which is updated.

16. The contents management method according to claim 9, further comprising:

if the number of snapshots in the first snapshot layer exceeds a corresponding limit for the first snapshot layer, migrating some of the snapshots from the first snapshot layer to the second snapshot layer and migrating remainder of the snapshots from the first snapshot layer to a third snapshot layer provided by yet another subsystem of the contents management system, and deleting the migrated snapshots from the first snapshot layer.

17. A non-transitory computer readable storage medium having computer readable program codes stored thereon, when executed by a computer, to perform a method comprising searching a location of a snapshot of an object among a plurality of objects stored in a storage subsystem in a contents management system which has a plurality of subsystems;

wherein snapshots of the objects are created and stored in a first snapshot layer provided by one of the subsystems;

wherein if the number of snapshots in the first snapshot layer exceeds a corresponding limit for the first snapshot layer, the snapshots from the first snapshot layer are migrated to a second snapshot layer provided by another subsystem of the contents management system, and the migrated snapshots are deleted from the first snapshot layer; and wherein location changes of the snapshots of the objects during migration of the snapshots are tracked and an index data of the snapshots of the objects is re-indexed based on the tracked location changes, the index data including identifiers of the objects and locations of the snapshots of the objects;

displaying an area to receive an identifier of the object for which the snapshot of the object is to be located; and displaying a location of the snapshot of the object associated with the identifier based on the index data.

18. The non-transitory computer readable storage medium according to claim 17, the method further comprising:

displaying an area to receive a range of date and time for searching the location of the snapshot of the object associated with the identifier, wherein the index data includes a date and a time at which each of the snapshots of the objects is stored at the location which is updated; and displaying the date and time as well as the location of the snapshot of the object associated with the identifier based on the index data.

19. The non-transitory computer readable storage medium according to claim 17, wherein the location for the snapshot of the object being displayed comprises a data store path that identifies the snapshot layer which stores the snapshot and the date and time at which the snapshot is stored in the identified snapshot layer.

* * * * *